United States Patent
Judge et al.

(10) Patent No.: US 6,241,260 B1
(45) Date of Patent: Jun. 5, 2001

(54) SPRING-LOADED QUICK CLAMP CHUCK

(75) Inventors: Alfred H. Judge, Jarrettesville, MD (US); Richard J. Heavel, Hanover; Robert H. Gifford, New Freedom, both of PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/375,882

(22) Filed: Aug. 17, 1999

(51) Int. Cl.⁷ .................................................. B23B 31/12
(52) U.S. Cl. ................................ 279/64; 279/60; 279/902
(58) Field of Search .................. 279/60–65, 140, 279/902, 904

(56) References Cited

U.S. PATENT DOCUMENTS

| | | |
|---|---|---|
| 3,229,554 | 1/1966 | Haddad . |
| 3,647,231 | 3/1972 | Schafer . |
| 3,861,693 | 1/1975 | Huber . |
| 4,277,074 | 7/1981 | Kilberis . |
| 4,381,116 * | 4/1983 | Futter .................... 279/62 |
| 4,463,960 * | 8/1984 | Walton .................... 279/60 |
| 4,498,682 | 2/1985 | Glore . |
| 4,648,608 | 3/1987 | Smith . |
| 4,701,083 | 10/1987 | Deutschenbaur et al. . |
| 4,991,859 | 2/1991 | Rohm . |
| 5,195,760 | 3/1993 | Wheeler et al. . |
| 5,407,215 | 4/1995 | Yang . |
| 5,685,549 | 11/1997 | Yang . |
| 5,820,134 | 10/1998 | Sublis Valls . |
| 5,988,653 * | 11/1999 | Kuo ........................ 279/62 |

FOREIGN PATENT DOCUMENTS

| | | | |
|---|---|---|---|
| 531920 * | 8/1931 | (DE) ................... 279/60 |
| 6922774 | 5/1969 | (DE) . |
| 2740202 A1 | 3/1979 | (DE) . |
| 3305733 A1 | 9/1983 | (DE) . |
| 3501870 * | 7/1985 | (DE) ................... 279/60 |
| 3604927 * | 8/1987 | (DE) ................... 279/64 |
| 3434112 C2 | 11/1987 | (DE) . |
| 3713457 C1 | 9/1988 | (DE) . |
| 3700167 C2 | 8/1991 | (DE) . |
| 4218835 A1 | 10/1992 | (DE) . |
| 3610671 C2 | 2/1993 | (DE) . |
| 3114503 C2 | 5/1993 | (DE) . |
| 3424679 C2 | 8/1993 | (DE) . |
| 4326652 A1 | 1/1994 | (DE) . |
| 3604927 C2 | 9/1994 | (DE) . |
| 4209307 C2 | 5/1995 | (DE) . |
| 4114884 C2 | 5/1997 | (DE) . |
| 29521475 U1 | 6/1997 | (DE) . |
| 19549206A1 | 7/1997 | (DE) . |
| 1973689A1 | 3/1998 | (DE) . |
| 0054774B1 | 6/1982 | (EP) . |
| 0178434B1 | 4/1986 | (EP) . |
| 0235607B1 | 9/1987 | (EP) . |
| 0316522B1 | 5/1989 | (EP) . |
| 0322513B1 | 7/1989 | (EP) . |
| 0450135B1 | 10/1991 | (EP) . |
| 0461806B1 | 12/1991 | (EP) . |
| 0580639B1 | 2/1994 | (EP) . |
| 959540 * | 3/1950 | (FR) ................... 279/60 |
| 556523 | 10/1953 | (GB) . |
| 2065001 | 6/1981 | (GB) . |
| 217341 | 8/1986 | (GB) . |
| 496405 * | 7/1954 | (IT) ................... 279/65 |

* cited by examiner

Primary Examiner—Steven C. Bishop
(74) Attorney, Agent, or Firm—Harness, Dickey & Pierce, P.L.C.

(57) ABSTRACT

A drill has a chuck with a body member and a bore to receive a cutting tool. A plurality of jaw members are coupled with the body to retain the cutting tool in the bore. A mechanism to secure the cutting tool in the jaws is coupled with the body. The mechanism applies a biasing force on the jaw members which enables the jaw members to slide on the body between a locked position securing the cutting tool in the jaw members and an unlocked position which enables egress and ingress of the cutting tool into and out of the jaw members.

30 Claims, 5 Drawing Sheets

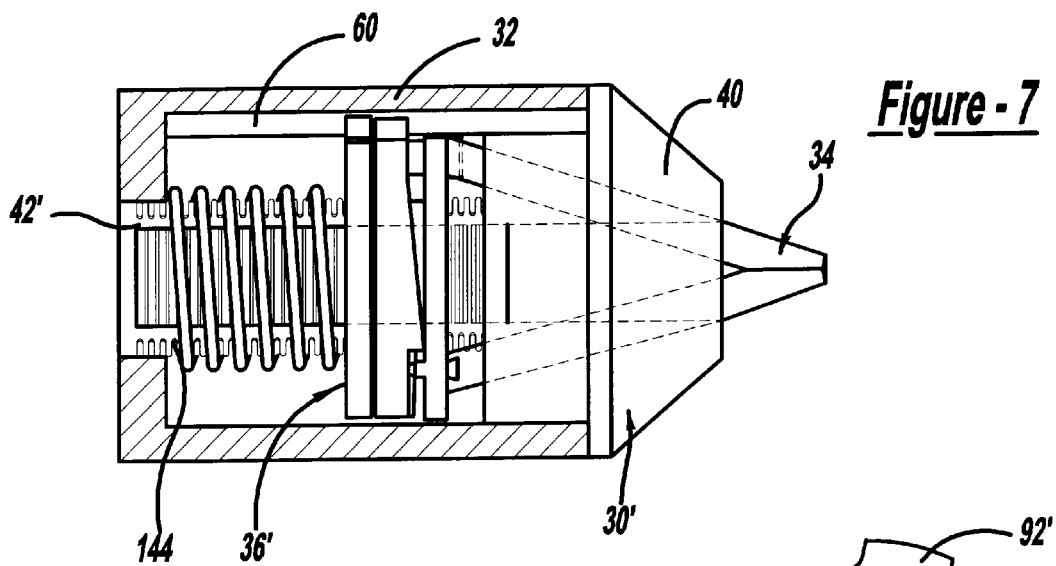
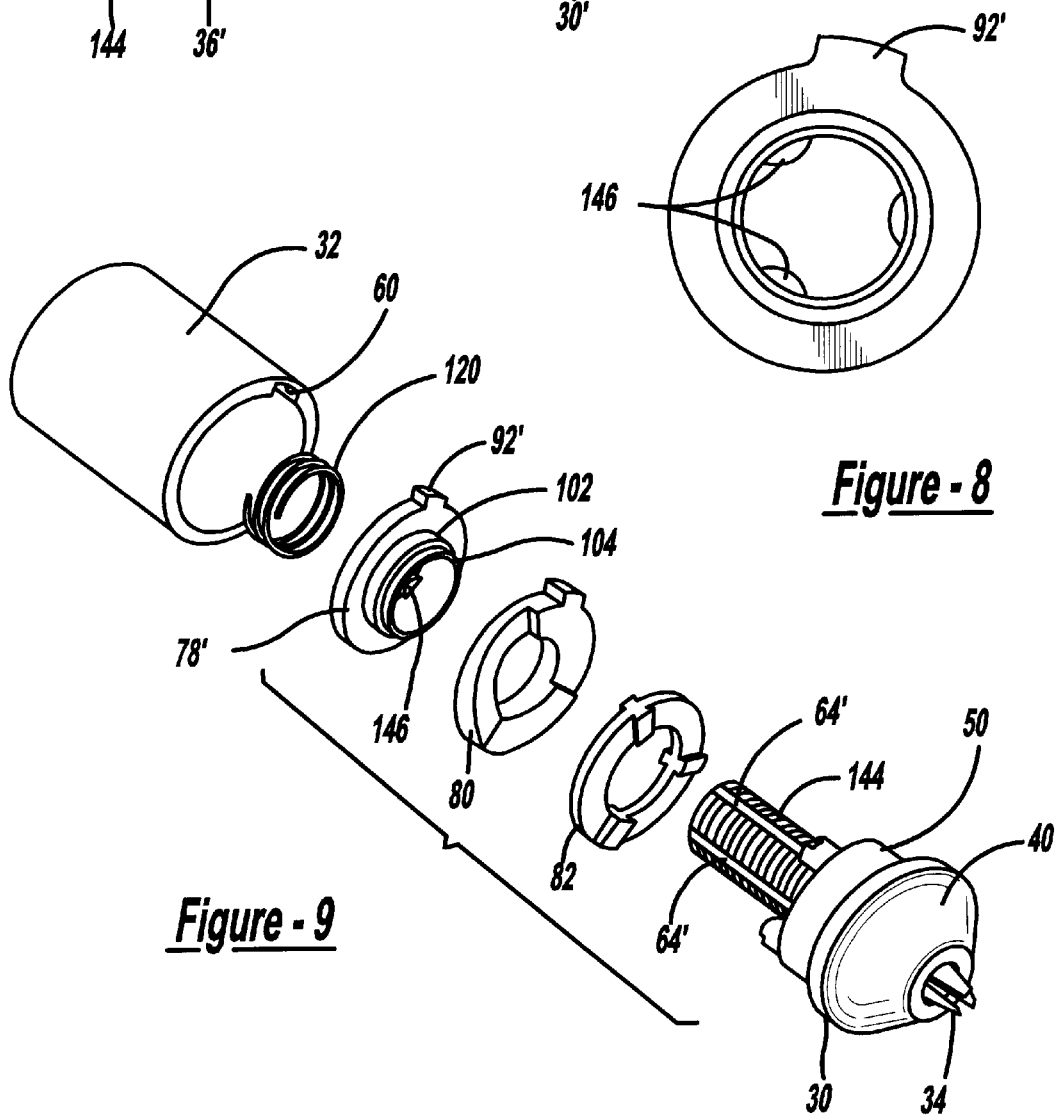

SPRING-LOADED QUICK CLAMP CHUCK

BACKGROUND AND SUMMARY OF THE INVENTION

The present invention relates to rotary tools and, more particularly, to chucks which quickly grasp and release tools within the chuck.

In both consumer and professional power tools such as drills, a chuck is commonly used to retain the cutting tool within the drill. Ordinarily, the chuck includes three jaw members which apply circumferential retaining forces onto the tool. The chuck includes a sleeve which is normally rotated clockwise or counter-clockwise in order to release or tighten the jaw members. The sleeve ordinarily includes threads which mate with thread portions on the jaw members so that as the sleeve is rotated, the mating threads axially move the jaw members in the desired direction.

While these types of chucks are satisfactory for retaining cutting tools in the chuck, they have some disadvantages. One disadvantage is that the chuck sleeve must be constantly rotated in order to open or close the jaw members in order to accommodate several different size diameter tools. This continuous rotation is time-consuming and burdensome. Accordingly, it would be desirable to overcome these disadvantages.

The present invention provides the art with a chuck which enables quick loading and unloading of the cutting tool. The jaw members are spring biased which enable a cutting tool to be moved axially into the jaw members by applying an axial force onto the tips of the jaw members which, in turn, forces the jaw members to open, enabling the tool to enter the jaw members. The jaw members bias back around the cutting tool. The chuck sleeve is rotated, to lock the jaw members around the cutting tool.

In accordance with a first aspect of the invention, a chuck comprises a body member which includes a bore to receive a cutting tool. A plurality of jaw members, which retain the tool in the bore, are axially biased in the body member. A mechanism to lock and clamp the jaw members on the cutting tool is coupled with the jaw members and the body. The mechanism applies a biasing force onto the jaw members. The force enables the jaw members to slide on the body. The jaw members move between a gripping and locking position where the cutting tool is secured in the jaw members, and a position where the jaw members enable egress and ingress of the cutting tool into and out of the jaw members. The locking and gripping mechanism further includes a first and second plurality of rings and a sleeve surrounding both the plurality of rings. The first plurality of rings lock the mechanism in position on the body. The second plurality of rings exert a force on the jaw members to grip the cutting tool in the bore. A coil spring is coupled between the sleeve and the plurality of rings to apply a biasing force, which sets the axial location of the rings to correspond to a given diameter of the cutting tool. Alternatively, the locking and gripping mechanism includes a first ring to lock the mechanism on the body and at least one second ring to exert the locking force on the jaw members. The first ring has at least one engagement member extending radially inward to engage a groove on the body to rotationally lock the first ring on the body. The first ring includes a cam surface to engage the second ring to force the second ring forward to exert the gripping force on the jaw members. The second ring includes a cam member contacting the cam surface. Also, a third ring may be included which includes the cam surface. The body may include a plurality of circumferential partial grooves and at least one axial groove. The circumferential grooves may be helical. The sleeve surrounding the rings may include an axial slot on its inner peripheral surface to receive projections from at least one of the rings. Upon rotation of the sleeve, one of the rings rotates to lock the mechanism (stack of rings) in position on the body and then a second ring exerts a force on the jaw members to grip the tool.

In accordance with a second aspect of the invention, a power tool is provided which includes a chuck. The chuck has a body member which includes a bore to receive a cutting tool. A plurality of jaw members, which retain the tool in the bore, are axially biased in the body member. A mechanism to lock and clamp the jaw members on the cutting tool is coupled with the jaw members and the body. The mechanism applies a biasing force onto the jaw members. The force enables the jaw members to slide on the body. The jaw members move between a gripping and locking position where the cutting tool is secured in the jaw members and positioned where the jaw members enable egress and ingress of the cutting tool into and out of the jaw members. The locking and gripping mechanism further includes a first and second plurality of rings and a sleeve surrounding both the plurality of rings. The first plurality of rings lock the mechanism in position on the body. The second plurality of rings exert a force on the jaw members to grip the cutting tool in the bore. A coil spring is coupled between the sleeve and the plurality of rings to apply a biasing force, which sets the axial location of the rings to correspond to a given diameter of the cutting tool. Alternatively, the locking and gripping mechanism includes a first ring to lock the mechanism on the body and at least one second ring to exert the locking force on the jaw members. The first ring has at least one engagement member extending radially inward to engage a groove on the body to rotationally lock the first ring on the body. The first ring includes a cam surface to engage the second ring to force the second ring forward to exert the gripping force on the jaw members. The second ring includes a cam member contacting the cam surface. Also, a third ring may be included which includes the cam surface. The body may include a plurality of circumferential partial grooves and at least one axial groove. The circumferential grooves may be helical. The sleeve surrounding the rings may include an axial slot on its inner peripheral surface to receive projections from at least one of the rings. Upon rotation of the sleeve, one of the rings rotates to lock the mechanism (stack of rings) in position on the body and then a second ring exerts a force on the jaw members to grip the tool.

Additional objects and advantages of the present invention will become apparent from the detailed description of the preferred embodiment, and the appended claims and accompanying drawings, or may be learned by practice of the invention.

BRIEF DESCRIPTION OF THE DRAWINGS

FIG. 7 is a cross-section view of a second embodiment of a chuck in accordance with the present invention.

FIG. 8 is an elevation view of a ring of FIG. 7.

FIG. 9 is an exploded perspective view of the chuck of the second embodiment.

DETAILED DESCRIPTION OF THE PREFERRED EMBODIMENT

Figure 1:
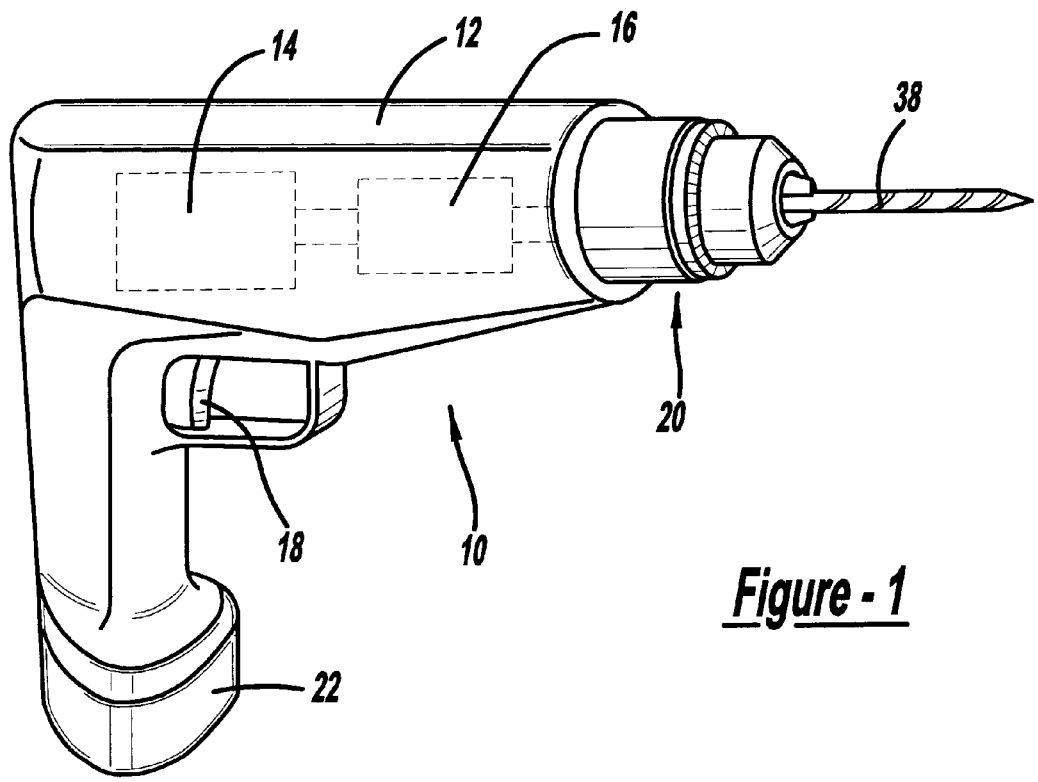
FIG. 1 illustrates an elevational view of a first embodiment of a rotary tool with a chuck in accordance with the present invention.

Turning to the figures, particularly FIG. 1, a rotary tool, such as a drill, is illustrated and designated with the reference numeral 10. The drill includes a housing 12 which encloses a motor 14. The motor 14 is coupled with a gear train 16 which rotates the chuck 20. Activation button 18 is electrically coupled with a power source 22 which may be a battery or a cord. The activation member 18 is coupled with the power source 22 and the motor 14 to rotate the chuck 20. Also, the drill may include a mechanism for reversing the rotation of the chuck 20.

Figure 2:
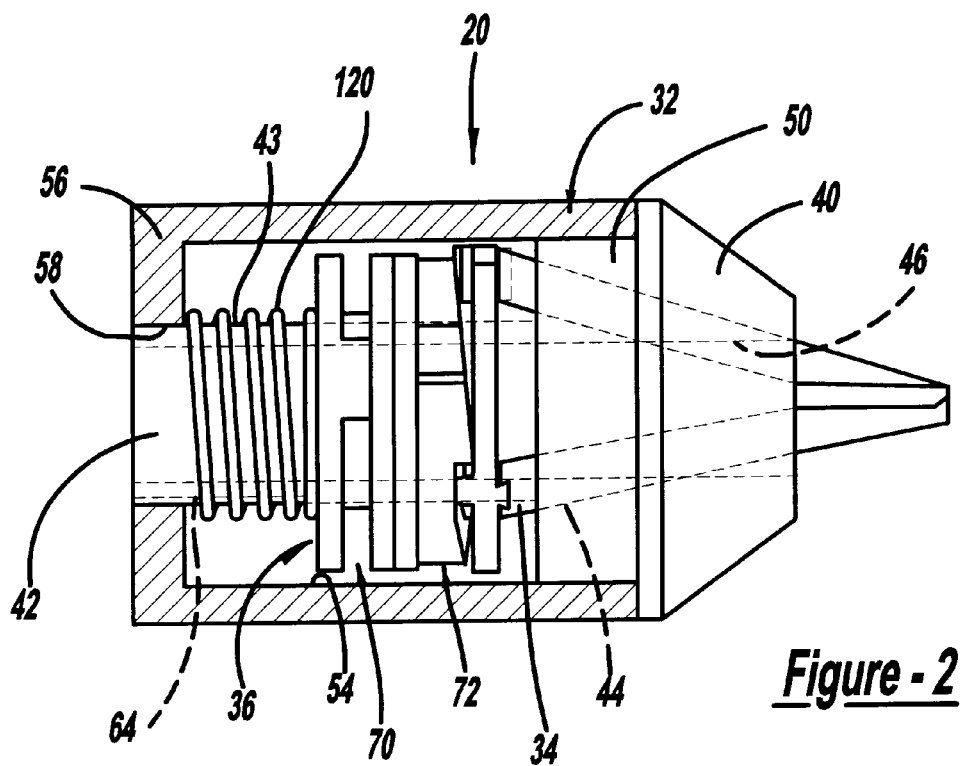
FIG. 2 is a cross-section view of the chuck of FIG. 1.
Figure 3:
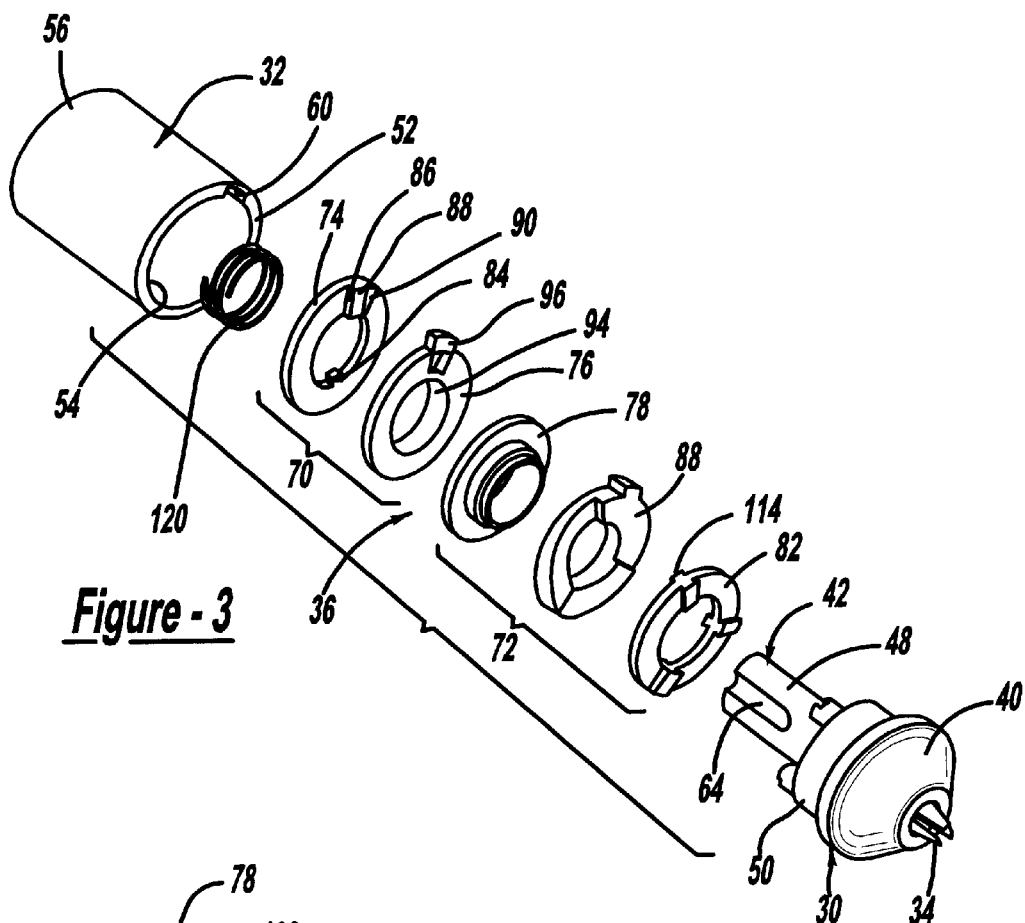
FIG. 3 is an exploded perspective view of the chuck in accordance with FIG. 2.

Turning to FIGS. 2 and 3, a first embodiment of the chuck in accordance with the invention is illustrated. The chuck 20 includes a body 30, a sleeve 32, jaw members 34, and a mechanism 36 for locking the jaw members on a cutting tool 38. The chuck body 30 includes a head portion 40 and a tail portion 42. The head portion 40 has an overall conical appearance with a plurality of bores 44 which receive a jaw member 34. A central bore 46 extends through the head and a portion of the tail portion 42 of the chuck body 40. The bore 46 serves to receive the cutting tool 38. The tail portion 42 is cylindrical and has a smooth outer peripheral surface 48. Also, the head portion 40 includes a cylindrical portion 50 which provides a shoulder which the sleeve 32 rests upon.

The sleeve 32 is a cylindrical sleeve. The sleeve 32 is open at one end 52. The sleeve inner bore 54 has a diameter which enables the sleeve 32 to rest on the shoulder 50. At the other end 56 of the sleeve, the sleeve has a smaller bore 58 which rests upon the cylindrical surface 48 of the tail portion 42. The sleeve also includes an axial slot 60 which mates with the gripping mechanism 36.

Figure 4:
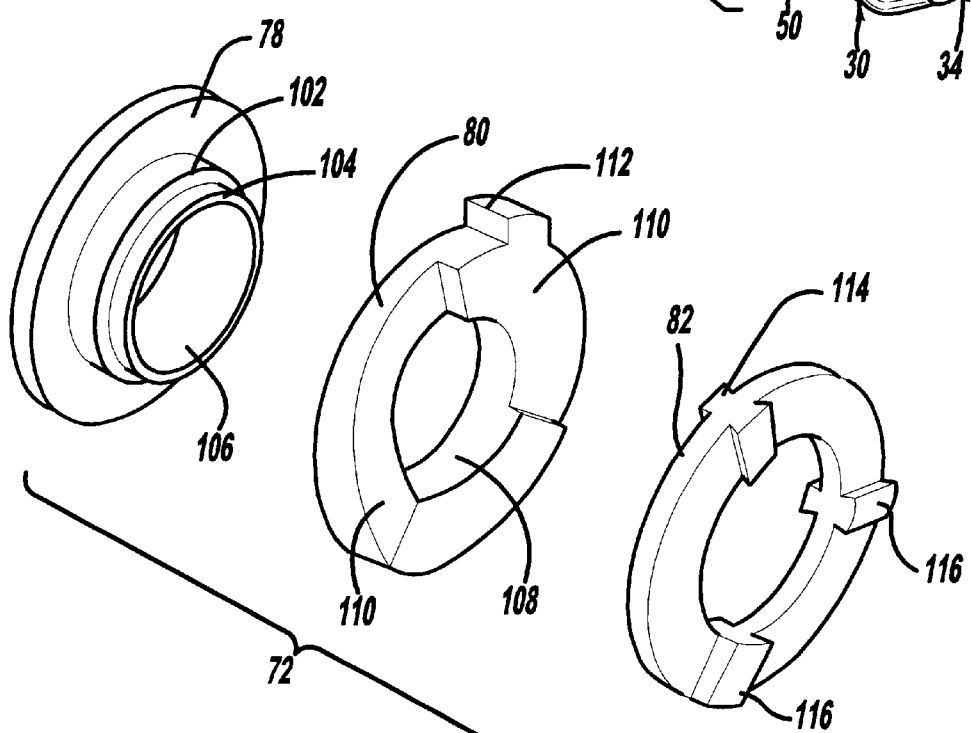
FIG. 4 is an exploded perspective view of a first set of rings of FIG. 1.

The locking mechanism 36 includes a locking portion 70 (FIGS. 5 and 6) and a gripping portion 72 (FIG. 4). The locking portion 70 includes a pair of rings 74 and 76. The securing portion includes rings 78, 80 and 82.

The locking portion 70 includes ring 74 which has a projecting member 84 which projects into slot 64 on the tail portion 42. Thus, the ring 74 is locked with the chuck 30. Also, the ring 74 includes an axial projecting member 86 which includes cam surfaces 88 and 90. The ring has an inner bore 92.

The ring 76 includes an aperture 94 which rides along the cam surfaces 88. Also, the ring 76 includes a tab member 96 which rides within the axial slot 60 of the sleeve 32. The ring 76 includes an axially extending flange 98 which is along its bore 100. The flange 98 abuts the ring 74.

The gripping portion 72 includes rings 78, 80 and 82. Ring 78 includes an axial flange 102 which includes a stepped portion 104. The flange 102 enables the ring 80 to rotate on it while the height of the flange 102 maintains a minimum axial distance between the face of the ring 82 and the facing surface of the ring 78, thus preventing binding of the ring 80 in the unlocked position. The ring 78 has a bore 106 which extends through the ring as well as the flanges 102 and 104. The bore is sized to ride on the cylindrical surface 48 of the tail portion 42 of the chuck body 30.

The second ring 80 includes a bore 108 sized to ride on the flange 102. Also, the ring 80 includes a plurality of cam surfaces. The cam surfaces 110 are angled and project axially along the tail 42. Also, the ring 80 includes a tab 112 which fits within the axial slot 60 of the sleeve 32.

The ring 82 includes a plurality of cam members 114. The plurality of cam members 114 contact the cam surfaces 110 of the ring 80 to provide axial movement of the ring 82. The ring 82 also includes a plurality of jaw retaining members 116 which couple with the jaw members 34 to secure the jaw members 34 onto the cutting tool 38. Members 116 may be "dove-tailed" or have some other detail to ensure contact with jaws 34.

A biasing member 120 is positioned between the locking and gripping mechanism 36 and the end 56 of the sleeve 32. The biasing member 120 may be a helical spring. The biasing member 120 applies a biasing force onto the ring 74 which, in turn, applies a force to the remaining rings 76–82. Thus, the rings 74–82 may axially move along the tail portion 42 in response to the biasing force of the spring 120 or the axial force of the jaw members 34.

In use, when a cutting tool 38 is positioned into the chuck, the cutting tool is moved axially against the jaw members 34. The jaw members 34, in turn, push against ring 82. Ring 82, in turn, pushes against the remainder of the rings 74–80. Ring 74 pushes against spring 120 compressing the spring 120 which, in turn, enables the jaw members 34 to move axially on the body head 40 opening to accept the cutting tool 38. After, the shank of the cutting tool 38 passes into the jaw members 34, the spring 120 applies a biasing force, via the rings 74–82, closing the jaws 34 around the shank of the cutting tool 38. Accordingly, the spring 120 biases jaws 34, thus centering and holding the bit in place while rotating sleeve 32. The sleeve 32 is then rotated to secure the cutting tool 38 within the chuck. As the sleeve 32 is rotated, the tab 96 of the ring 76, which tab is larger than the tab 112 of ring 80, begins to rotate. As it rotates, the aperture moves against the cam surfaces 88, 90, locking the ring 74 against axial movement on the tail portion 42. As rotation of the sleeve 32 continues to occur, ring 80 is rotated which, in turn, contacts the cam surfaces 110 against the cam members 114 of ring 82. As the cam members 114 run up the ramps of the cam surfaces 110 of ring 80, the ring 82 is moved forward. As the ring 82 moves forward, the jaw members 34 likewise move forward, applying a securing force onto the shank of the cutting tool 38. This force locks the cutting tool within the chuck 30. To remove the cutting tool 38 from the chuck 30, the sleeve is rotated in the opposite direction which frees the jaw members as well as the ring 74 which enables the cutting tool to be pulled out of the chuck 30.

Figure 5:
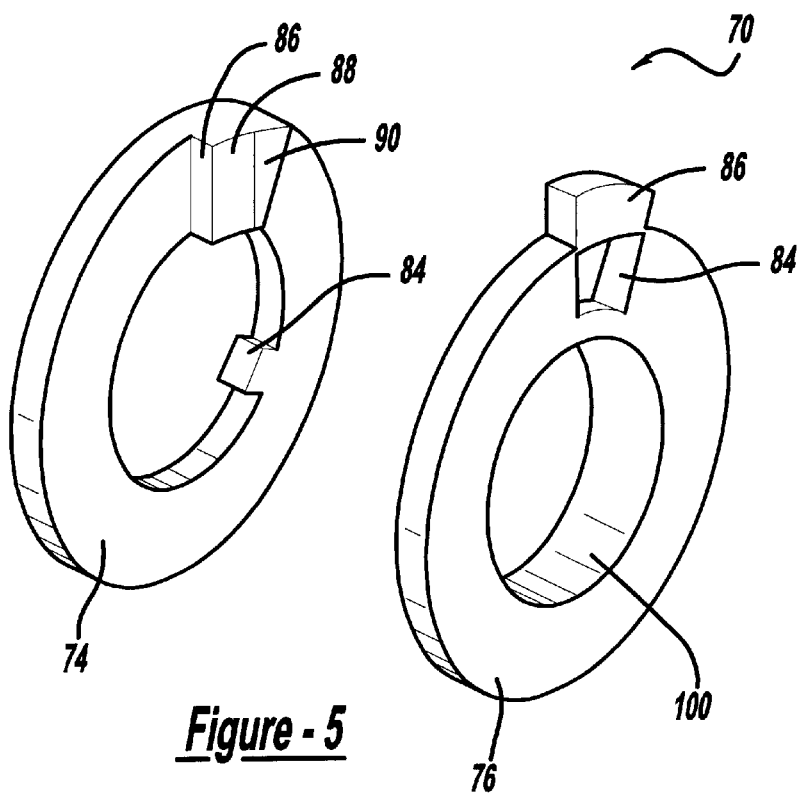
FIG. 5 is an exploded perspective view of a second set of rings of FIG. 1.
Figure 6:
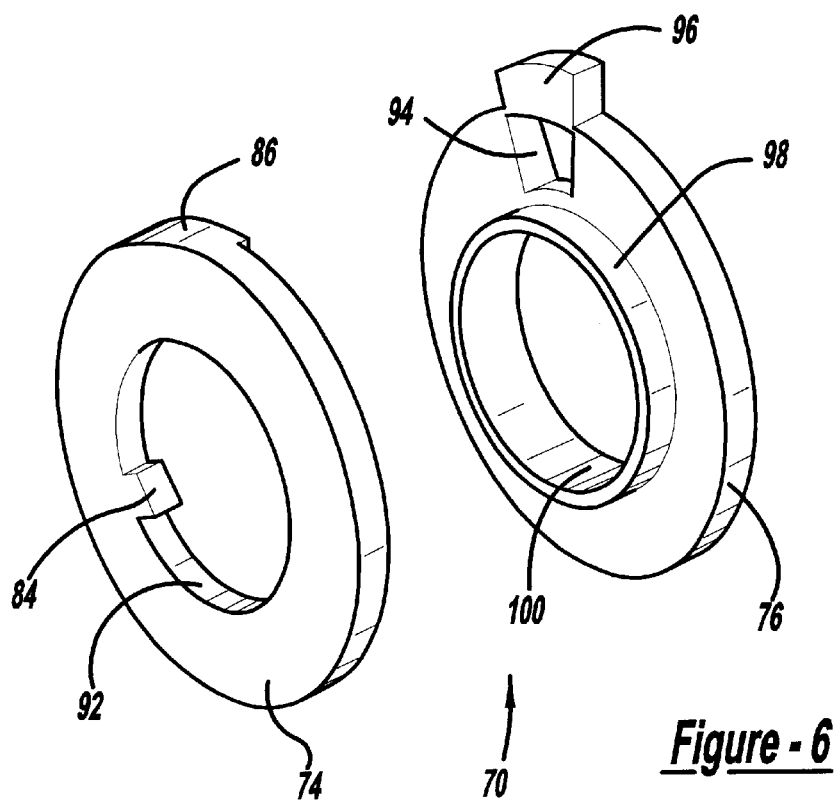
FIG. 6 is a view like FIG. 5 rotated one hundred eighty (180°) degrees.

Moving to FIGS. 7–9, a second embodiment of the present invention is shown. The elements which are the same as those previously described are marked with the same reference numerals. The elements which are different include primes. The difference between the first embodiment as shown in FIGS. 4 and 5 is that the locking and gripping mechanism 36' has been simplified.

Here, the chuck tail portion 42' has been modified to include a plurality of grooves 144 and includes a plurality of slots 64'. The mechanism for gripping and locking 36' has been modified. The locking and gripping mechanism 36' includes rings 78', 80 and 82. The rings 80 and 82 are substantially the same as those previously described.

The ring 78' has been modified. The ring 78' includes flanges 102 and 104 to seat the rings 80 and 82. The ring bore 106 includes a plurality of projecting members 146 which mesh with the grooves 144 of the tail portion 42'. Also, the ring 78' includes a tab 92' to enable rotation of the ring 78'.

Here, when the projecting members 146 are in the slot 64', the spring 120 applies the biasing force to the ring 78', 80 and 82 enabling biased axial movement on the tail portion 42'. The jaw members act in the same way to enable ingress of the cutting tool 38 into the chuck. Thus, all rings 78', 80 and 82 move axially to compress the spring 120 to enable the shank to be positioned within the jaws. The spring 120 applies the biasing force on the ring 78' with the projecting members 146 in grooves 64' enabling the ring 78' to slide along the tail portion 42'.

As the sleeve 32 is rotated, the projecting members 146 mesh with grooves 144 in the tail portion 42'. As the projecting members 146 mesh with grooves 144, the ring 78' is axially locked in position along the tail portion 42'. Continued rotation of the sleeve 32 rotates the sleeve 80 which, in turn, axially moves the ring 82 as the cam surfaces 110 mate against the cam elements 114 as explained above. As the sleeve is rotated in an opposite direction, the projecting members 146 move back into axial grooves 64' enabling the assembly to move axially, which enables the cutting tool 38 to be removed from the chuck 30.

Figure 10:
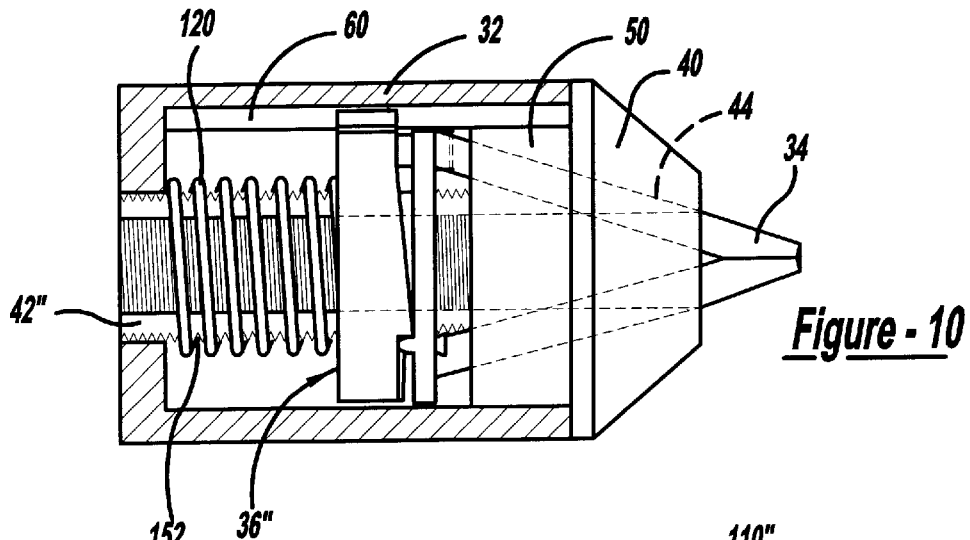
FIG. 10 is a cross-section view of a third embodiment of the present invention.
Figure 11:
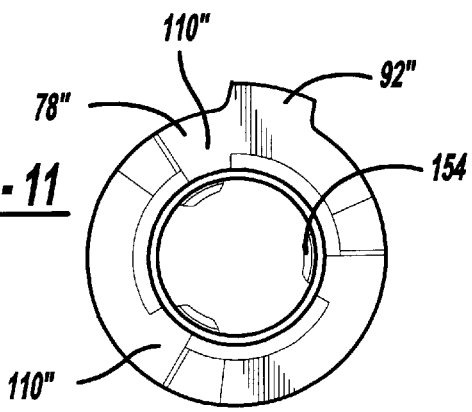
FIG. 11 is an elevation view of a ring of FIG. 10
Figure 12:
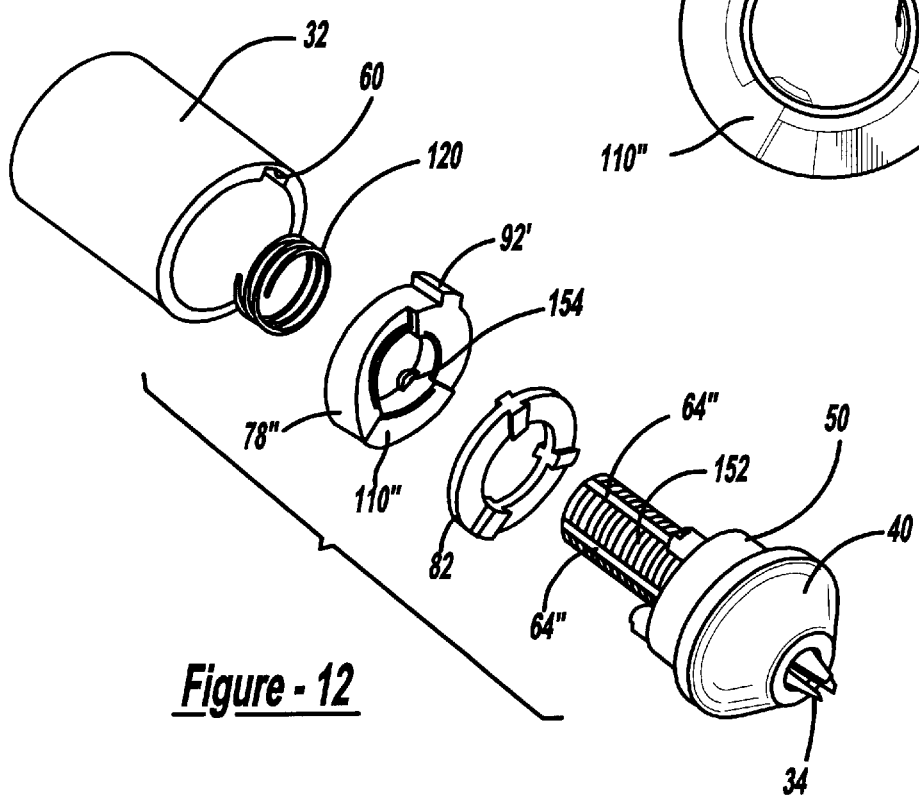
FIG. 12 is an exploded perspective view of the chuck of the third embodiment.

Moving to FIGS. 10–12, a third embodiment of the present invention is shown. Here, the elements which are the same as previously described are marked with the same numerals, while the modified components are marked with double primes.

In FIGS. 10–12, the locking and gripping mechanism 36" has been further simplified. Here, the mechanism 36" includes two rings 78" and 82. The ring 82 is like that previously described.

The tail portion 42" has been modified to include partial thread portions 152. The thread portions 152 are on a desired helical path. The ring 78" has been modified so that the bore includes a plurality of inwardly projecting thread portions 154. The thread portions 154 mate with the thread portions 152 of the tail portion 42" while clamping cutting tool 38. Also, the tail portion 42" includes a plurality of axial slots 64". The ring 78" includes thread portions 154 which ride in the sleeve slots 64" when unlocked. Also, the ring 78" includes cam surfaces 110" on its front face. The cam surfaces 110" act like those of ring 80 to apply force onto the ring 82. Thus, as the ring 78" is rotated, due to the mating helical threads 152, 154, the ring 78" moves axially forward, enabling the cam surfaces 110" to apply force onto the cam members 114 of the ring 82. Thus, the member 78" during rotation is axially secured while simultaneously applying the forward force onto the ring 82 which, in turn, applies gripping force to the jaws 34. The jaw members 34 apply force onto the tool 38 as previously described. The sleeve 32 is rotated in the opposite direction which places thread members 152 into slots 64" enabling removal of the tool 38.

While the above detailed description describes the preferred embodiment of the present invention, the invention is susceptible to modification, variation, and alteration without deviating from the scope and fair meaning of the subjoined claims.

What is claimed is:

1. A chuck comprising:

a body member having a bore for receiving a tool;

a plurality of jaw members for retaining the tool in said bore, said jaw members being axially biased in said body member;

a mechanism for locking and clamping said jaws on the tool, said mechanism applying a biasing force on said jaw members enabling said jaw members to slide on said body between a locked position gripping the tool in the jaw members and an unlocked position enabling egress and ingress of the tool into and out of the jaw members, said mechanism for locking and clamping includes a first ring for locking the mechanism on the body and at least one second ring for applying the locking force on the jaw members, and said first ring has at least one engagement member engaging the body for rotationally locking the first ring on the body.

2. The chuck according to claim 1, wherein said locking and gripping mechanism further comprising a first plurality of rings and a second plurality of rings and a sleeve surrounding both plurality of rings.

3. The chuck according to claim 2, wherein said first plurality of rings locks said mechanism in position on said body.

4. The chuck according to claim 3, wherein said second plurality of rings is coupled with said jaw members for securely gripping the tool.

5. The chuck according to claim 2, wherein each plurality of rings includes a member coupled with said sleeve such that upon rotation of said sleeve, said mechanism being axially locked to said body and the tool is securely gripped by said jaw members.

6. The chuck according to claim 2, wherein a coil spring being coupled between said sleeve and said plurality of rings for applying said biasing force.

7. The chuck according to claim 1, wherein said at least one engagement member extending radially inward for engaging a groove on said body.

8. The chuck according to claim 7, wherein said first ring includes a cam surface for engaging said second ring forcing said second ring axially for applying said gripping force of said jaw members.

9. The chuck according to claim 8, wherein said second ring includes a cam member contacting said cam surface.

10. The chuck according to claim 8, wherein a third ring includes said cam surface.

11. The chuck according to claim 1, said body including a plurality of circumferentially partial grooves and at least one axial groove.

12. The chuck according to claim 11, wherein said circumferential grooves are on a helix.

13. The chuck according to claim 1 and a sleeve surrounding said first and second rings for activating said mechanism.

14. The chuck according to claim 13, wherein an axial slot is formed on an inner periphery of said sleeve.

15. The chuck according to claim 14 wherein said first and second rings include tabs projecting into said sleeve slots, said first ring tab being circumferentially larger than said second ring tab such that upon rotation of said sleeve said first ring locks in position on said body before said second rings apply the gripping force on said jaw members.

16. A drill comprising:

a housing;

a motor in said housing;

a power source coupled with said motor;

an output drive coupled with said motor;

an actuation switch coupled with said motor and power source for actuating said drill; and a chuck coupled with said output drive, said chuck comprising:

a body member having a bore for receiving a tool;

a plurality of jaw members for retaining the tool in said bore, said jaw members being axially biased in said body member;

a mechanism for locking and clamping said jaws on the tool, said mechanism applying a biasing force on said jaw members enabling said jaw members to slide on said body between a locked position gripping the tool in the jaw members and an unlocked position enabling egress and ingress of the tool into and out of the jaw members, said mechanism for locking and clamping includes a first ring for locking the mechanism on the body and at least one second ring for applying the locking force on the jaw members, and said first ring has at least one engagement member engaging the body for rotationally locking the first ring on the body.

17. The drill according to claim 16, wherein said locking and gripping mechanism further comprising a first plurality of rings and a second plurality of rings and a sleeve surrounding both plurality of rings.

18. The drill according to claim 17, wherein said first plurality of rings locks said mechanism in position on said body.

19. The drill according to claim 18, wherein said second plurality of rings is coupled with said jaw members for securely gripping the tool.

20. The drill according to claim 17, wherein each plurality of rings includes a member coupled with said sleeve such that upon rotation of said sleeve, said mechanism being axially locked to said body and the tool is securely gripped by said jaw members.

21. The drill according to claim 17, wherein a coil spring being coupled between said sleeve and said plurality of rings for applying said biasing force.

22. The drill according to claim 16, wherein said at least one engagement member extending radially inward for engaging a groove on said body.

23. The drill according to claim 22, wherein said first ring includes a cam surface for engaging said second ring forcing said second ring axially for applying said gripping force of said jaw members.

24. The drill according to claim 23, wherein said second ring includes a cam member contacting said cam surface.

25. The drill according to claim 23, wherein a third ring includes said cam surface.

26. The drill according to claim 16, said body including a plurality of circumferentially partial grooves and at least one axial groove.

27. The drill according to claim 26, wherein said circumferential grooves are on a helix.

28. The drill according to claim 16 and a sleeve surrounding said first and second rings for activating said mechanism.

29. The drill according to claim 28, wherein an axial slot is formed on an inner periphery of said sleeve.

30. The drill according to claim 29, wherein said first and second rings include tabs projecting into said sleeve slots, said first ring tab being circumferentially larger than said second ring tab such that upon rotation of said sleeve said first ring locks in position on said body before said second rings apply the gripping force on said jaw members.

* * * * *